United States Patent
Sugiura et al.

(10) Patent No.: US 9,601,785 B2
(45) Date of Patent: Mar. 21, 2017

(54) FUEL CELL

(75) Inventors: Seiji Sugiura, Utsunomiya (JP); Shuji Sato, Utsunomiya (JP); Takahiro Takai, Utsunomiya (JP); Yasuhiro Watanabe, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 466 days.

(21) Appl. No.: 13/379,972

(22) PCT Filed: Jun. 2, 2010

(86) PCT No.: PCT/JP2010/059313
§ 371 (c)(1),
(2), (4) Date: Dec. 21, 2011

(87) PCT Pub. No.: WO2010/150628
PCT Pub. Date: Dec. 29, 2010

(65) Prior Publication Data
US 2012/0094208 A1    Apr. 19, 2012

(30) Foreign Application Priority Data

Jun. 25, 2009    (JP) ................................ 2009-151229

(51) Int. Cl.
| H01M 8/04 | (2016.01) |
| H01M 8/10 | (2016.01) |
| H01M 8/02 | (2016.01) |
| H01M 2/16 | (2006.01) |
| H01M 10/14 | (2006.01) |
| H01M 2/14 | (2006.01) |
| H01M 10/0585 | (2010.01) |

(52) U.S. Cl.
CPC ........... *H01M 8/0247* (2013.01); *H01M 2/14* (2013.01); *H01M 2/1673* (2013.01); *H01M 8/0202* (2013.01); *H01M 8/0206* (2013.01); *H01M 8/0258* (2013.01); *H01M 8/1007* (2016.02); *H01M 10/0585* (2013.01); *H01M 10/14* (2013.01); *Y02E 60/50* (2013.01)

(58) Field of Classification Search
CPC .... H01M 10/0585; H01M 10/14; H01M 2/14; H01M 2/1673; H01M 8/0202
See application file for complete search history.

(56) References Cited

U.S. PATENT DOCUMENTS

| 8,110,316 B2 | 2/2012 | Oda et al. |
| 2002/0192531 A1 | 12/2002 | Zimmerman et al. |
| 2003/0091885 A1* | 5/2003 | Kobayashi .......... H01M 8/0273 29/623.2 |
| 2005/0136306 A1 | 6/2005 | Sugiura et al. |
| 2006/0204807 A1* | 9/2006 | Kosaka et al. ................. 429/26 |
| 2006/0216572 A1 | 9/2006 | Yoshida et al. |
| 2008/0070080 A1* | 3/2008 | Miyazaki ............ H01M 8/0247 429/482 |

FOREIGN PATENT DOCUMENTS

| CN | 101312250 | 11/2008 |
| JP | 2001-110434 | 4/2001 |
| JP | 2003-142126 | 5/2003 |
| JP | 2006-172924 | 6/2006 |
| JP | 2009-59513 | 3/2009 |

OTHER PUBLICATIONS

International Search Report for Application No. PCT/JP2010/059313, dated Aug. 10, 2010.
Supplementary European Search Report for Application No. 10791946.6, 5 pages, dated Feb. 4, 2013.
Chinese Office Action for Application No. 201080026467.3, 9 pages, dated Aug. 27, 2013.

* cited by examiner

*Primary Examiner* — Ladan Mohaddes
(74) *Attorney, Agent, or Firm* — Nelson Mullins Riley & Scarborough LLP; Anthony A. Laurentano

(57) ABSTRACT

An oxidant gas conduit communicating with both an oxidant gas inlet communication hole and an oxidant gas outlet communication hole is formed in a surface of a cathode-side metallic separator which forms a fuel cell. Continuous linear guide ridges which protrude from intermediate height sections to the oxidant gas conduit side and form continuous guide conduits are provided on the cathode-side metallic separator. The linear guide ridges are continuously connected to ends of rectilinear conduit ridges which form rectilinear conduits, are provided with bend portions, and are set to lengths which are different from each other in a step-like manner.

5 Claims, 10 Drawing Sheets

FUEL CELL

RELATED APPLICATIONS

This application is a 35 U.S.C. 371 national stage filing of International Application No. PCT/JP2010/059313, filed Jun. 2, 2010, which claims priority to Japanese Patent Application No. 2009-151229 filed on Jun. 25, 2009 in Japan. The contents of the aforementioned applications are hereby incorporated by reference.

TECHNICAL FIELD

The present invention relates to a fuel cell formed by stacking an electrolyte electrode assembly and a metal separator in the form of a corrugated plate in a stacking direction. The electrolyte electrode assembly includes electrodes and an electrolyte interposed between the electrodes. A reactant gas flow field as a passage of a fuel gas or an oxygen-containing gas is formed on one surface of the metal separator. A reactant gas passage for the fuel gas or the oxygen-containing gas extends through the fuel cell in the stacking direction.

BACKGROUND ART

For example, a solid polymer electrolyte fuel cell employs an electrolyte membrane. The electrolyte membrane is a polymer ion exchange membrane. The electrolyte membrane is interposed between an anode and a cathode to form a membrane electrode assembly (MEA). The membrane electrode assembly is sandwiched between a pair of separators to form a unit cell for generating electricity. In use, normally, a predetermined number of unit cells are stacked together to form a fuel cell stack.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the separators for supplying a coolant along surfaces of the separators.

In this regard, the fuel cell may adopt internal manifold structure in which fuel gas passages for flowing a fuel gas therethrough, oxygen-containing gas passages for flowing an oxygen-containing gas therethrough, and coolant passages for flowing a coolant therethrough are formed in the fuel cell and extend through the fuel cell in the stacking direction.

As a fuel cell of this type, for example, a fuel cell disclosed in Japanese Laid-Open Patent Publication No. 2006-172924 is known. As shown in FIG. 10, a separator 1 disclosed in Japanese Laid-Open Patent Publication No. 2006-172924 includes a fuel gas flow field 2. The fuel gas flow field 2 includes a main flow field 3 connected to an inlet manifold 6a and an outlet manifold 6b through a distribution section 4 and a merge section 5.

The main flow field 3 is divided by a plurality of ribs 7a, and the distribution section 4 and the merge section 5 are divided by a plurality of ribs 7b, 7c. The ribs 7b, 7c are divided respectively by disconnected portions 8a, 8b in the middle in the longitudinal direction. The disconnected portions 8a, 8b of the ribs 7b, 7c are shifted from disconnected portions 8a, 8b of the adjacent ribs 7b, 7c in the longitudinal direction of the separator 1.

SUMMARY OF INVENTION

However, in the separator 1, since each of the ribs 7b, 7c is divided into a plurality of pieces by the disconnected portions 8a, 8b, water produced in the power generation reaction tends to stagnate at the disconnected portions 8a, 8b. In this case, the fuel gas and the oxygen-containing gas flow around the produced water, and flows between the ribs 7b, 7c. Therefore, the water cannot be discharged from the fuel cell. As a result, the fuel gas and the oxygen-containing gas may not flow smoothly, and thus the power generation performance may be lowered undesirably.

Further, in the case where water flows into the fuel cell stack from the outside, the water may stagnate therein, and cannot be discharged from the fuel cell stack. As a result, the power generation performance may be lowered undesirably.

Further, since the ribs 7b, 7c are divided into a plurality of pieces by the disconnected portions 8a, 8b, the sizes of the distribution section 4 and the merge section 5 that are, in effect, not used in power generation become large. As a result, the entire separator 1 is large in size.

The present invention has been made to solve the problems of these types, and an object of the present invention is to provide a fuel cell which is capable of improving the performance of discharging water produced by the power generation reaction in reactant gas flow fields, and suitably achieving size reduction of the fuel cell.

The present invention relates to a fuel cell formed by stacking an electrolyte electrode assembly and a metal separator in the form of a corrugated plate in a stacking direction. The electrolyte electrode assembly includes electrodes and an electrolyte interposed between the electrodes. A reactant gas flow field as a passage of a fuel gas or an oxygen-containing gas is formed on one surface of the metal separator. A reactant gas passage for the fuel gas or the oxygen-containing gas extends through the fuel cell in the stacking direction.

The metal separator includes a buffer provided between an end of the reactant gas flow field and the reactant gas passage. A plurality of continuous linear guide ridges are provided on the buffer, and the linear guide ridges include bent portions, and have different lengths in a stepwise manner.

In the present invention, the continuous linear guide ridges are provided in the buffer. The linear guide ridges include the bent portions, and have different lengths in a stepwise manner. Thus, the reactant gas does not flow around water produced in the power generation reaction. In the structure, by the reactant gas, the water produced in the power generation reaction is easily and reliably discharged. Also, the reactant gas can be supplied uniformly, and a desired power generation performance can be maintained suitably. Further, the areas of the buffer can be reduced effectively, and the overall size of the fuel cell can be reduced easily.

DESCRIPTION OF EMBODIMENTS

Figure 1:
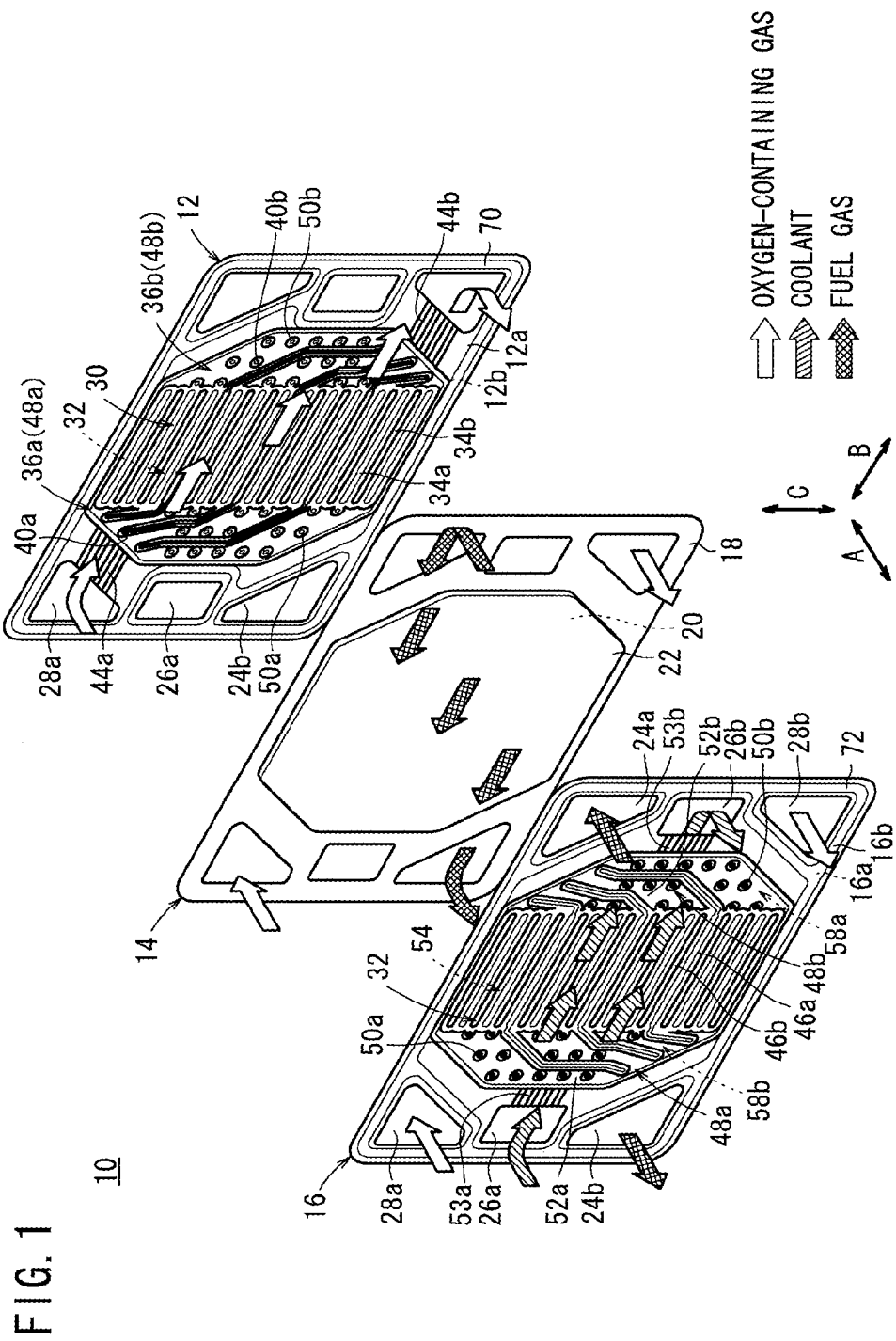
FIG. 1 is an exploded perspective view showing main components of a fuel cell according to a first embodiment of the present invention.

As shown in FIG. 1, a fuel cell 10 according to a first embodiment of the present invention includes a cathode-side metal separator 12, a membrane electrode assembly (electrolyte electrode assembly) (MEA) 14, and an anode-side metal separator 16.

For example, the cathode-side metal separator 12 and the anode-side metal separator 16 are made of steel plates, stainless steel plates, aluminum plates, plated steel sheets, or metal plates having anti-corrosive surfaces by surface treatment. The cathode-side metal separator 12 and the anode-side metal separator 16 are formed by pressing metal thin plates into corrugated plates to have ridges and grooves in cross section.

For example, the membrane electrode assembly 14 includes a cathode 20, an anode 22, and a solid polymer electrolyte membrane (electrolyte) 18 interposed between the cathode 20 and the anode 22. The solid polymer electrolyte membrane 18 is formed by impregnating a thin membrane of perfluorosulfonic acid with water, for example.

Each of the cathode 20 and the anode 22 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 20 and the electrode catalyst layer of the anode 22 are fixed to both surfaces of the solid polymer electrolyte membrane 18, respectively.

At one end of the fuel cell 10 in a longitudinal direction indicated by the arrow B, a fuel gas supply passage 24a for supplying a fuel gas such as a hydrogen containing gas, a coolant discharge passage 26b for discharging a coolant, and an oxygen-containing gas discharge passage 28b for discharging an oxygen-containing gas are provided. The fuel gas supply passage 24a, the coolant discharge passage 26b, and the oxygen-containing gas discharge passage 28b extend through the fuel cell 10 in the direction indicated by the arrow A.

At the other end of the fuel cell 10 in the longitudinal direction indicated by the arrow B, an oxygen-containing gas supply passage 28a for supplying the oxygen-containing gas, a coolant supply passage 26a for supplying the coolant, and a fuel gas discharge passage 24b for discharging the fuel gas are provided. The oxygen-containing gas supply passage 28a, the coolant supply passage 26a, and the fuel gas discharge passage 24b extend through the fuel cell 10 in the direction indicated by the arrow A.

The oxygen-containing gas supply passage 28a has a substantially triangular shape, and includes two sides in parallel to two sides of a corner of the fuel cell 10. The oblique side connected to these two sides of the triangle is in parallel to an outer line 37c of an inlet buffer 36a as described later. The oxygen-containing gas discharge passage 28b, the fuel gas supply passage 24a, and the fuel gas discharge passage 24b have the same structure as the oxygen-containing gas supply passage 28a.

Figure 2:
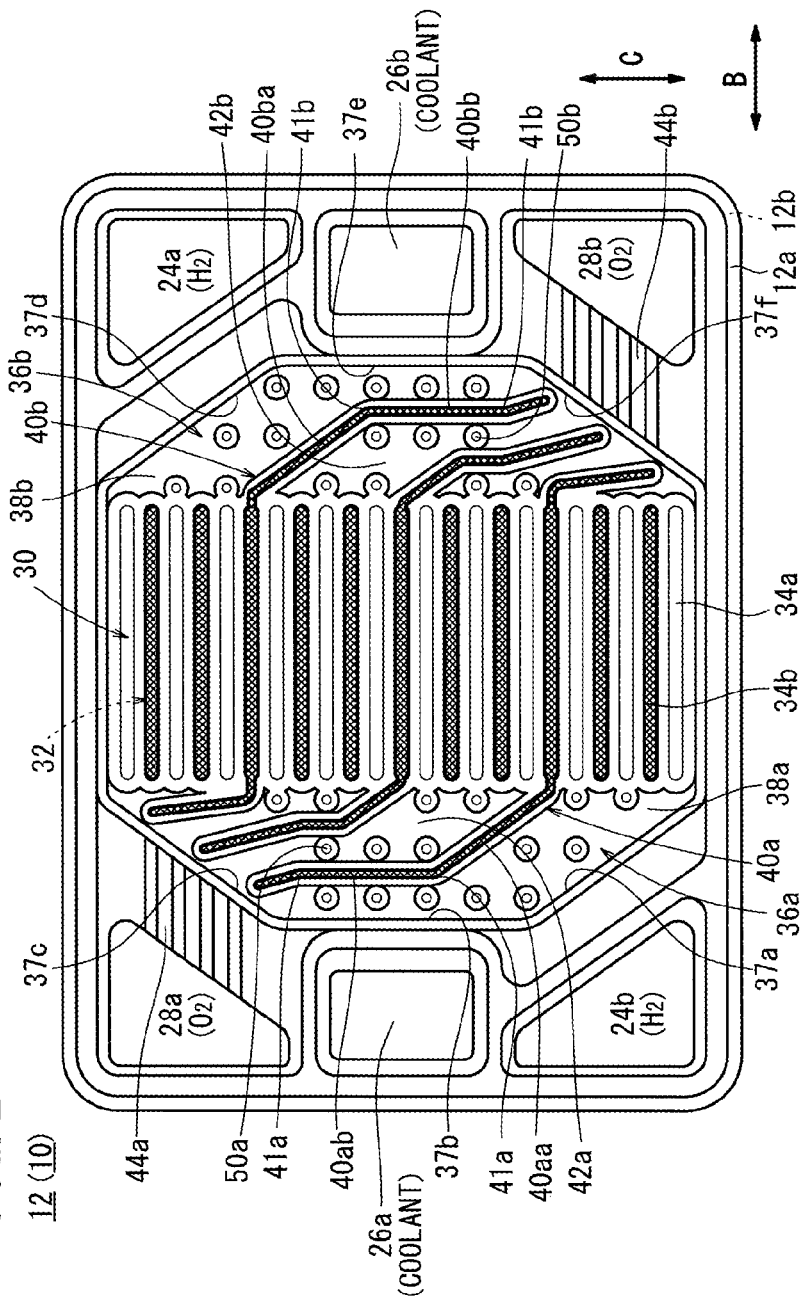
FIG. 2 is a view showing one surface of a cathode-side metal separator of the fuel cell.

As shown in FIGS. 1 and 2, the cathode-side metal separator 12 has an oxygen-containing gas flow field (reactant gas flow field) 30 on its surface 12a facing the membrane electrode assembly 14. The oxygen-containing gas flow field 30 is connected between the oxygen-containing gas supply passage 28a and the oxygen-containing gas discharge passage 28b. On the other surface 12b of the cathode-side metal separator 12, there is formed a coolant flow field 32, which has a shape corresponding to the back side of the oxygen-containing gas flow field 30.

The oxygen-containing gas flow field 30 includes a plurality of straight flow grooves 34a along the power generation surface extending in the direction indicated by the arrow B, and also includes an inlet buffer (distribution section) 36a and an outlet buffer (merge section) 36b. The straight flow grooves 34a are arranged in the direction indicated by the arrow C. The inlet buffer 36a and the outlet buffer 36b are provided adjacent to the inlet and the outlet of the straight flow grooves 34a, respectively. The straight flow grooves 34a are formed between straight flow field ridges (linear flow field ridges) 34b protruding from the surface 12a. Instead of the straight flow field ridges 34b, curved, bent, or wavy ridges (not shown) may be adopted.

It should be noted that the present invention is at least applicable to the inlet buffer 36a or the outlet buffer 36b. Hereinafter, it is assumed that the present invention is applied to both of the inlet buffer 36a and the outlet buffer 36b.

The inlet buffer 36a includes outer lines 37a, 37b, and 37c forming a substantially trapezoidal (polygonal) shape in a front view. The outer line 37a is in parallel to the inner wall surface of the fuel gas discharge passage 24b, the outer line 37b is in parallel to the inner wall surface (vertical surface) of the coolant supply passage 26a, and the outer line 37c is in parallel to the inner wall surface of the oxygen-containing gas supply passage 28a. The outer lines 37a to 37c may form a triangle, a rectangle or the like.

The inlet buffer 36a includes a plurality of continuous linear guide ridges 40a protruding from an intermediate height area 38a toward the oxygen-containing gas flow field 30 side. The linear guide ridges 40a form a continuous guide flow field 42a.

Figure 3:
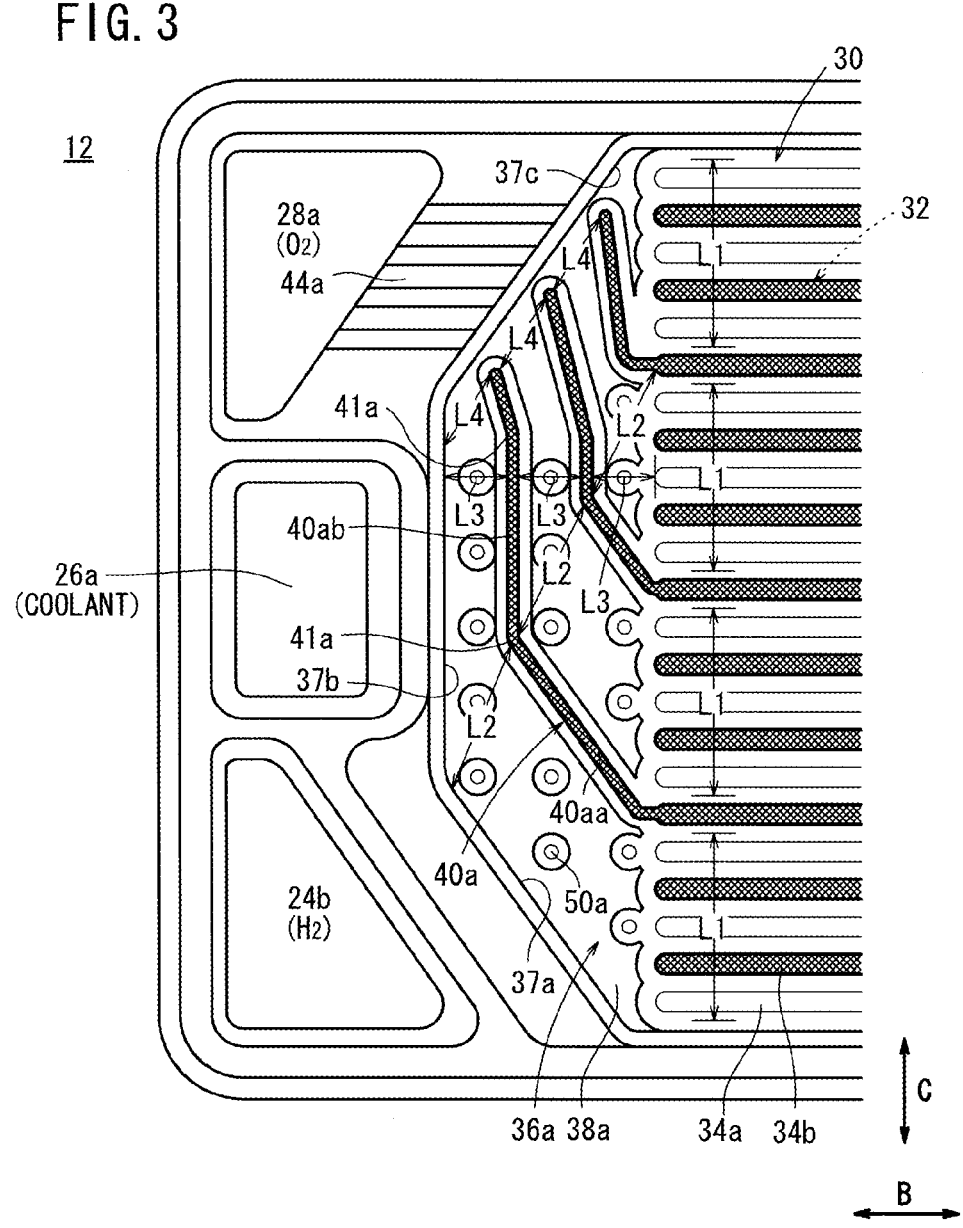
FIG. 3 is an enlarged view showing main components of the cathode-side metal separator.

As shown in FIGS. 2 and 3, the linear guide ridges 40a are continuously connected to ends of the straight flow field ridges 34b of the straight flow grooves 34a at predetermined positions. Further, each of the linear guide ridges 40a has a bent portion 41a, and the linear guide ridges 40a have different lengths in a stepwise fashion. The linear guide ridges 40a have the same width. The width of the linear guide ridges 40a is narrower than, or equal to the width of the straight flow field ridges 34b.

The linear guide ridge 40a connected to the straight flow field ridge 34b near the oxygen-containing gas supply passage 28a is shorter than the linear guide ridge 40a connected to the straight flow field ridge 34b remote from the oxygen-containing gas supply passage 28a. The linear guide ridge 40a includes a straight line segment 40aa in parallel to the outer line 37a. Further, the linear guide ridge 40a includes a straight line segment 40ab in parallel to the outer line 37b.

As shown in FIG. 3, the linear guide ridges 40a are arranged such that intervals between connections of the linear guide ridges 40a with the straight flow field ridges 34b are the same distance L1, intervals between the bent portions 41a are the same distance L2, intervals between vertical segments thereof are the same distance L3, and intervals between ends thereof near the oxygen-containing gas supply passage 28a are the same distance L4. It is preferable that the linear guide ridges 40a are equally arranged at the same distance L1, the same distance L2, the same distance L3, and the same distance L3 at respective positions. However, the linear guide ridges 40a may be arranged at different distances.

The inlet buffer 36a is connected to the oxygen-containing gas supply passage 28a through a bridge section 44a. For example, the bridge section 44a is formed by corrugating a seal member to have ridges and grooves. Other bridge sections as described later have the same structure.

As shown in FIG. 2, the outlet buffer 36b and the inlet buffer 36a are symmetrical with respect to a point. The outlet buffer 36b includes outer lines 37d, 37e, and 37f forming a substantially trapezoidal (polygonal) shape in a front view. The outer line 37d is in parallel to the inner wall surface of the fuel gas supply passage 24a, the outer line 37e is in parallel to the inner wall surface (vertical surface) of the coolant discharge passage 26b, and the outer line 37f is in parallel to the inner wall surface of the oxygen-containing gas discharge passage 28b.

The outlet buffer 36b includes linear guide ridges 40b protruding from an intermediate height area 38b toward the oxygen-containing gas flow field 30 side. The linear guide ridges 40b form a continuous guide flow field 42b. The outlet buffer 36b is connected to the oxygen-containing gas discharge passage 28b through a bridge section 44b. The outlet buffer 36b has the same structure as the inlet buffer 36a, and detailed description of the outlet buffer 36b is omitted.

Figure 4:
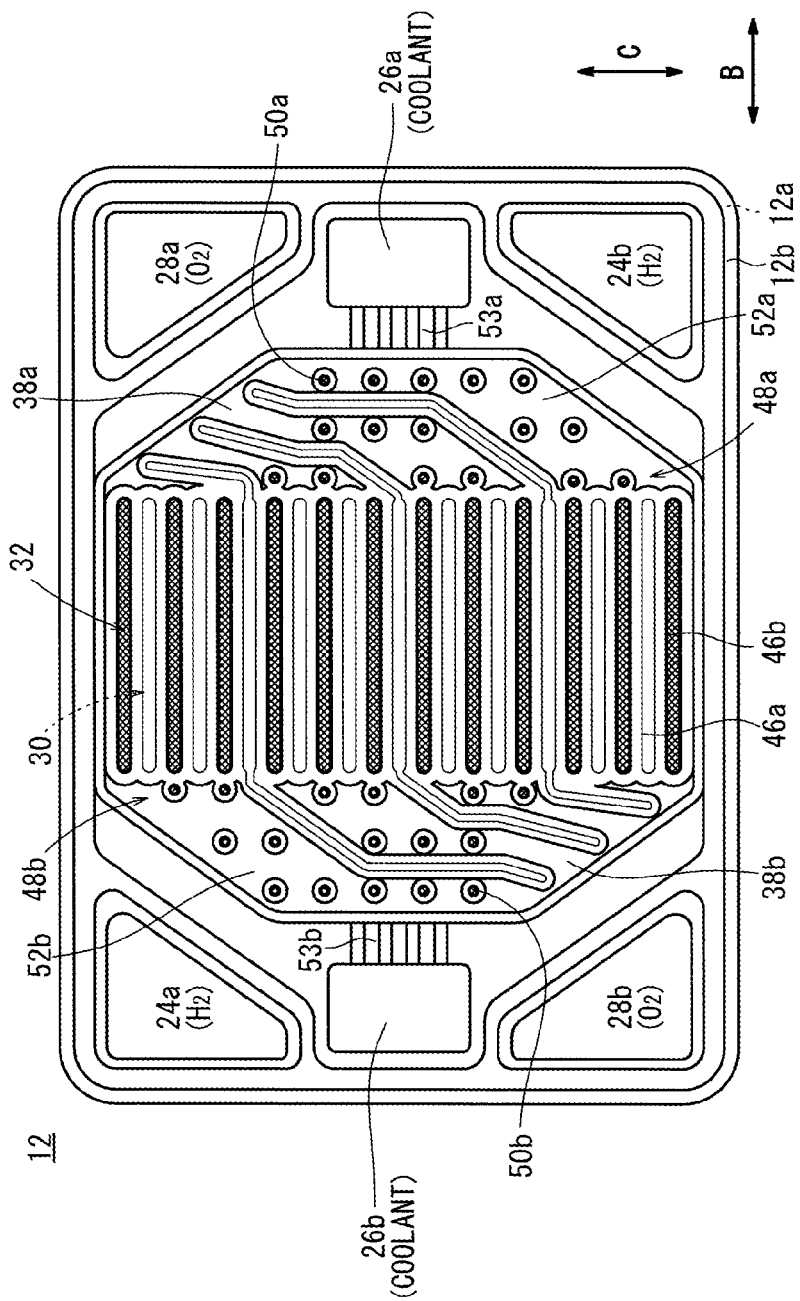
FIG. 4 is a view showing the other surface of the cathode-side metal separator.

As shown in FIG. 4, the coolant flow field 32 is formed on the other surface 12b of the cathode-side metal separator 12, the coolant flow field 32 having a shape corresponding to the back side of the oxygen-containing gas flow field 30. The coolant flow field 32 includes a plurality of straight flow grooves 46a along the power generation surface extending in the direction indicated by the arrow B, and also includes an inlet buffer 48a and an outlet buffer 48b. The straight flow grooves 46a are arranged in the direction indicated by the arrow C. The inlet buffer 48a and the outlet buffer 48b are provided adjacent to the inlet and the outlet of the straight flow grooves 46a, respectively.

The straight flow grooves 46a are formed between straight flow field ridges (linear flow field ridges) 46b protruding from the surface 12b. The straight flow grooves 46a have a shape corresponding to the back side of the straight flow field ridges 34b, and the straight flow field ridges 46b have a shape corresponding to the back side of the straight flow grooves 34a. The inlet buffer 48a has a shape corresponding to the back side of the inlet buffer 36a, and the outlet buffer 48b has a shape corresponding to the back side of the outlet buffer 36b (see FIG. 5).

Figure 5:
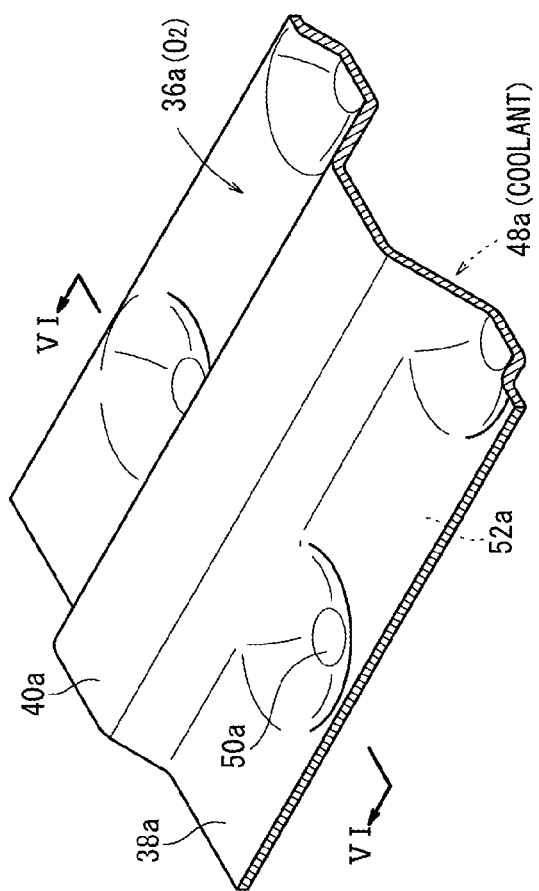
FIG. 5 is a partial perspective view showing an inlet buffer of the cathode-side metal separator.
Figure 6:
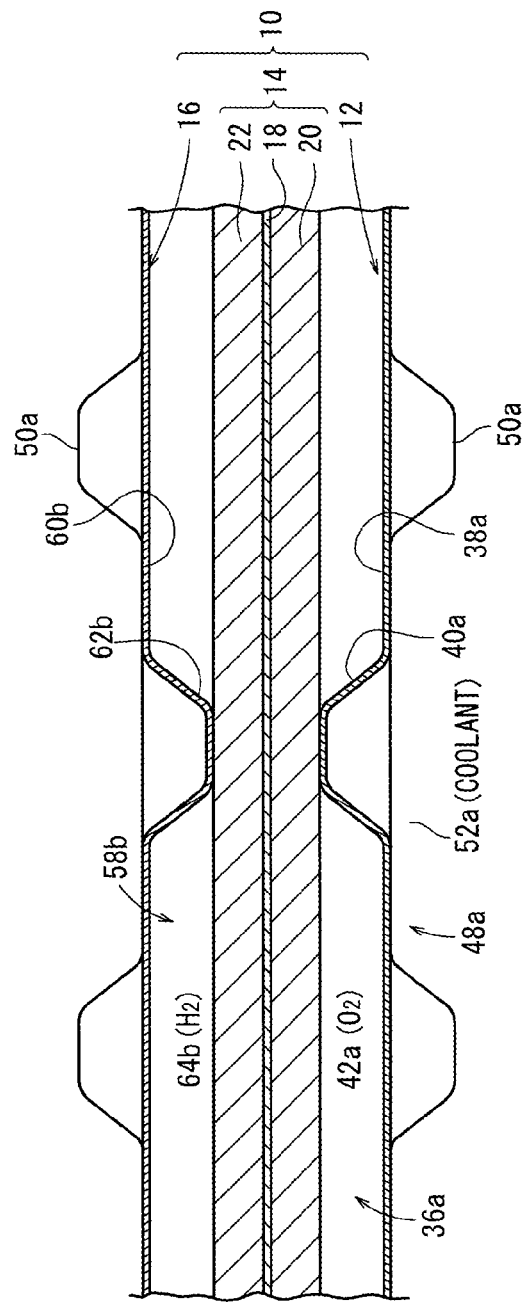
FIG. 6 is a cross sectional view showing the cathode-side metal separator, taken along a line VI-VI in FIG. 5.

As shown in FIGS. 5 and 6, the inlet buffer 48a includes bosses 50a protruding from the intermediate height area 38a toward the coolant flow field 32 side. The bosses 50a form an embossed flow field 52a. The depth of the continuous guide flow field 42a from the intermediate height area 38a is the same as the depth of the embossed flow field 52a from the intermediate height area 38a. The inlet buffer 48a is connected to the coolant supply passage 26a through a bridge section 53a (see FIG. 4).

As shown in FIG. 4, the outlet buffer 48b includes bosses 50b protruding from the intermediate height area 38b toward the coolant flow filed 32 side. The bosses 50b form an embossed flow field 52b. The outlet buffer 48b is connected to the coolant discharge passage 26b through a bridge section 53b.

Figure 7:
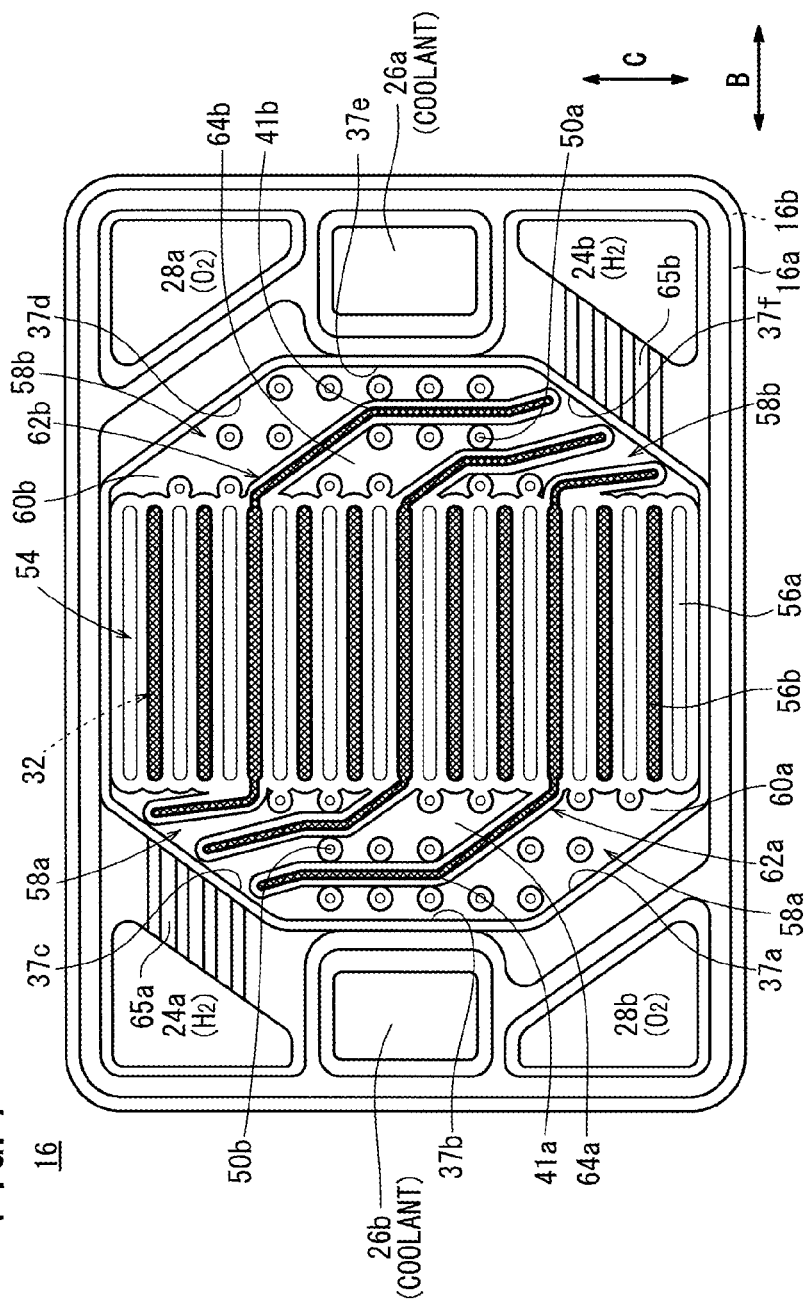
FIG. 7 is a front view showing an anode-side metal separator of the fuel cell.

As shown in FIG. 7, the anode-side metal separator 16 has a fuel gas flow field (reactant gas flow field) 54 on its surface 16a facing the membrane electrode assembly 14. The coolant flow field 32 is formed on a surface 16b of the anode-side metal separator 16, the coolant flow field 32 having a shape corresponding to the back side of the fuel gas flow field 54.

The fuel gas flow field 54 includes a plurality of straight flow grooves 56a along the power generation surface and which extend in the direction indicated by the arrow B. Also, the fuel gas flow field 54 includes an inlet buffer 58a and an outlet buffer 58b. The straight flow grooves 56a are arranged in the direction indicated by the arrow C. The inlet buffer 58a and the outlet buffer 58b are provided adjacent to the inlet and the outlet of the straight flow grooves 56a, respectively. The straight flow grooves 56a are formed between straight flow field ridges (linear flow field ridges) 56b protruding on the surface 16a. Instead of the straight flow field ridges 56b, curved, bent, or wavy ridges (not shown) may be adopted.

The inlet buffer 58a includes outer lines 37a, 37b, and 37c forming a substantially trapezoidal (polygonal) shape in a front view. The outer line 37a is in parallel to the inner wall surface of the oxygen-containing gas discharge passage 28b, the outer line 37b is in parallel to the inner wall surface (vertical surface) of the coolant discharge passage 26b, and the outer line 37c is in parallel to the inner wall surface of the fuel gas supply passage 24a. The outer lines 37a to 37c may form a triangle, a rectangle or the like.

The inlet buffer 58a includes a plurality of continuous linear guide ridges 62a protruding from an intermediate height area 60a toward the fuel gas flow field 54 side. The linear guide ridges 62a form a continuous guide flow field 64a.

The linear guide ridges 62a are continuously connected to ends of the straight flow field ridges 56b forming the straight flow grooves 56a. Further, each of the linear guide ridges 62a has a bent portion 41a, and the linear guide ridges 62a have different lengths in a stepwise fashion. The linear guide ridges 62a have the same width. The width of the linear guide ridges 62a is narrower than, or equal to the width of the straight flow field ridges 56b. The linear guide ridges 62a have the same structure as the linear guide ridges 40a, and detailed description of the linear guide ridges 62a is omitted. The inlet buffer 58a is connected to the fuel gas supply passage 24a through a bridge section 65a.

The outlet buffer 58b and the inlet buffer 58a are symmetrical with respect to a point. The outlet buffer 58b includes outer lines 37d, 37e, and 37f forming a substantially trapezoidal (polygonal) shape in a front view. The outer line 37d is in parallel to the inner wall surface of the oxygen-containing gas supply passage 28a, the outer line 37e is in parallel to the inner wall surface (vertical surface) of the coolant supply passage 26a, and the outer line 37f is in parallel to the inner wall surface of the fuel gas discharge passage 24b.

The outlet buffer 58b includes a plurality of continuous linear guide ridges 62b protruding from an intermediate height area 60b toward the fuel gas flow field 54 side. The linear guide ridges 62b form a continuous guide flow field 64b.

The linear guide ridges 62b are continuously connected to the ends of the straight flow field ridges 56b forming the straight flow grooves 56a. Further, each of the linear guide ridges 62b has a bent portion 41b, and the linear guide ridges 62b have different lengths in a stepwise fashion. The linear guide ridges 62b have the same structure as the linear guide ridges 40b, and detailed description of the linear guide ridges 62b is omitted. The outlet buffer 58b is connected to the fuel gas discharge passage 24b through a bridge section 65b.

As shown in FIG. 1, the coolant flow field 32 is formed on the other surface 16b of the anode-side metal separator 16, the coolant flow field 32 having a shape corresponding to the back side of the fuel gas flow field 54. The coolant flow field 32 has the same structure as that of the cathode-side metal separator 12. The constituent elements that are identical to those of the cathode-side metal separator 12 are labeled with the same reference numerals, and detailed description thereof is omitted.

A first seal member 70 is formed integrally with the surfaces 12a, 12b of the cathode-side metal separator 12, around the outer circumferential end of the cathode-side metal separator 12. A second seal member 72 is formed integrally with the surfaces 16a, 16b of the anode-side metal separator 16, around the outer circumferential end of the anode-side metal separator 16.

Operation of the fuel cell 10 will be described below.

Firstly, as shown in FIG. 1, an oxygen-containing gas is supplied to the oxygen-containing gas supply passage 28a, and a fuel gas such as a hydrogen-containing gas is supplied to the fuel gas supply passage 24a. Further, a coolant such as pure water, ethylene glycol, oil or the like is supplied to the coolant supply passage 26a.

In the structure, in the fuel cell 10, the oxygen-containing gas is supplied from the oxygen-containing gas supply passage 28a to the oxygen-containing gas flow field 30 of the cathode-side metal separator 12. The oxygen-containing gas moves from the inlet buffer 36a along the straight flow grooves 34a in the horizontal direction indicated by the arrow B, and the oxygen-containing gas is supplied to the cathode 20 of the membrane electrode assembly 14.

The fuel gas flows from the fuel gas supply passage 24a to the fuel gas flow field 54 of the anode-side metal separator 16. As shown in FIG. 7, the fuel gas moves from the inlet buffer 58a along the straight flow grooves 56a in the horizontal direction indicated by the arrow B, and the fuel gas is supplied to the anode 22 of the membrane electrode assembly 14.

Thus, in the membrane electrode assembly 14, the oxygen-containing gas supplied to the cathode 20, and the fuel gas supplied to the anode 22 are consumed in the electrochemical reactions at the electrode catalyst layers of the cathode 20 and the anode 22 for generating electricity.

Then, the oxygen-containing gas supplied to and consumed at the cathode 20 of the membrane electrode assembly 14 is discharged from the outlet buffer 36b along the oxygen-containing gas discharge passage 28b in the direction indicated by the arrow A. Likewise, the fuel gas supplied to and consumed at the anode 22 of the membrane electrode assembly 14 is discharged from the outlet buffer 58b into the fuel gas discharge passage 24b.

In the meanwhile, the coolant supplied to the coolant supply passage 26a flows into the coolant flow field 32 formed between the cathode-side metal separator 12 and the anode-side metal separator 16 of the fuel cell 10, and then, the coolant flows in the direction indicated by the arrow B. After the coolant flows from the inlet buffer 48a along the straight flow grooves 46a to cool the membrane electrode assembly 14, the coolant is discharged from the outlet buffer 48b into the coolant discharge passage 26b.

In the first embodiment, for example, as shown in FIG. 2, a plurality of continuous linear guide ridges 40a are provided in the inlet buffer 36a of the oxygen-containing gas flow field 30. The linear guide ridges 40a have the bent portions 41a, and have different lengths in a stepwise fashion. Likewise, the continuous linear guide ridges 40b are provided in the outlet buffer 36b. The linear guide ridges 40b have the bent portions 41b, and have different lengths in a stepwise fashion.

Thus, in the oxygen-containing gas flow field 30, since the inlet buffer 36a and the outlet buffer 36b have the continuous guide flow fields 42a, 42b, the oxygen-containing gas does not flow around the water produced in the power generation reaction. In the structure, by the oxygen-containing gas, the water produced in the power generation reaction is easily and reliably discharged from the inlet buffer 36a and the outlet buffer 36b. The oxygen-containing gas can be supplied uniformly, and desired power generation performance can be maintained suitably.

Further, the areas of the inlet buffer 36a and the outlet buffer 36b can be reduced effectively, and the overall size of the fuel cell 10 can be reduced easily.

Further, the straight line segment 40aa of the linear guide ridge 40a is in parallel to the outer line 37a, and the straight line segment 40ab of the linear guide ridge 40a is in parallel to the outer line 37b.

Further, as shown in FIG. 3, the linear guide ridges 40a are arranged such that intervals between connections between the linear guide ridges 40a and the straight flow field ridges 34b are the same distance L1, intervals between the bent portions 41a are the same distance L2, intervals between the vertical segments thereof are the same distance L3, and intervals between the ends thereof near the oxygen-containing gas supply passage 28a are the same distance L4. The linear guide ridges 40b have the same structure as the linear guide ridges 40a.

In the structure, the oxygen-containing gas is supplied smoothly and uniformly along the entire power generation surface in the oxygen-containing gas flow field 30, and suitable power generation performance can be obtained reliably. Further, in the fuel gas flow field 54, the same advantages as in the case of the oxygen-containing gas flow field 30 are obtained.

Further, in the coolant flow field 32, the inlet buffer 48a and the outlet buffer 48b have the embossed flow fields 52a, 52b. In the structure, improvement in the performance of distributing the coolant is achieved advantageously. The membrane electrode assembly 14 is held between the inlet buffer 36a, the outlet buffer 36b, and the inlet buffer 58a, the outlet buffer 58b.

Thus, in the fuel cell 10, degradation of the power generation performance due to insufficient supply of the oxygen-containing gas and the fuel gas can be prevented. Further, a desired cooling function can be obtained, and the power generation of the fuel cell 10 can be performed suitably.

Figure 8:
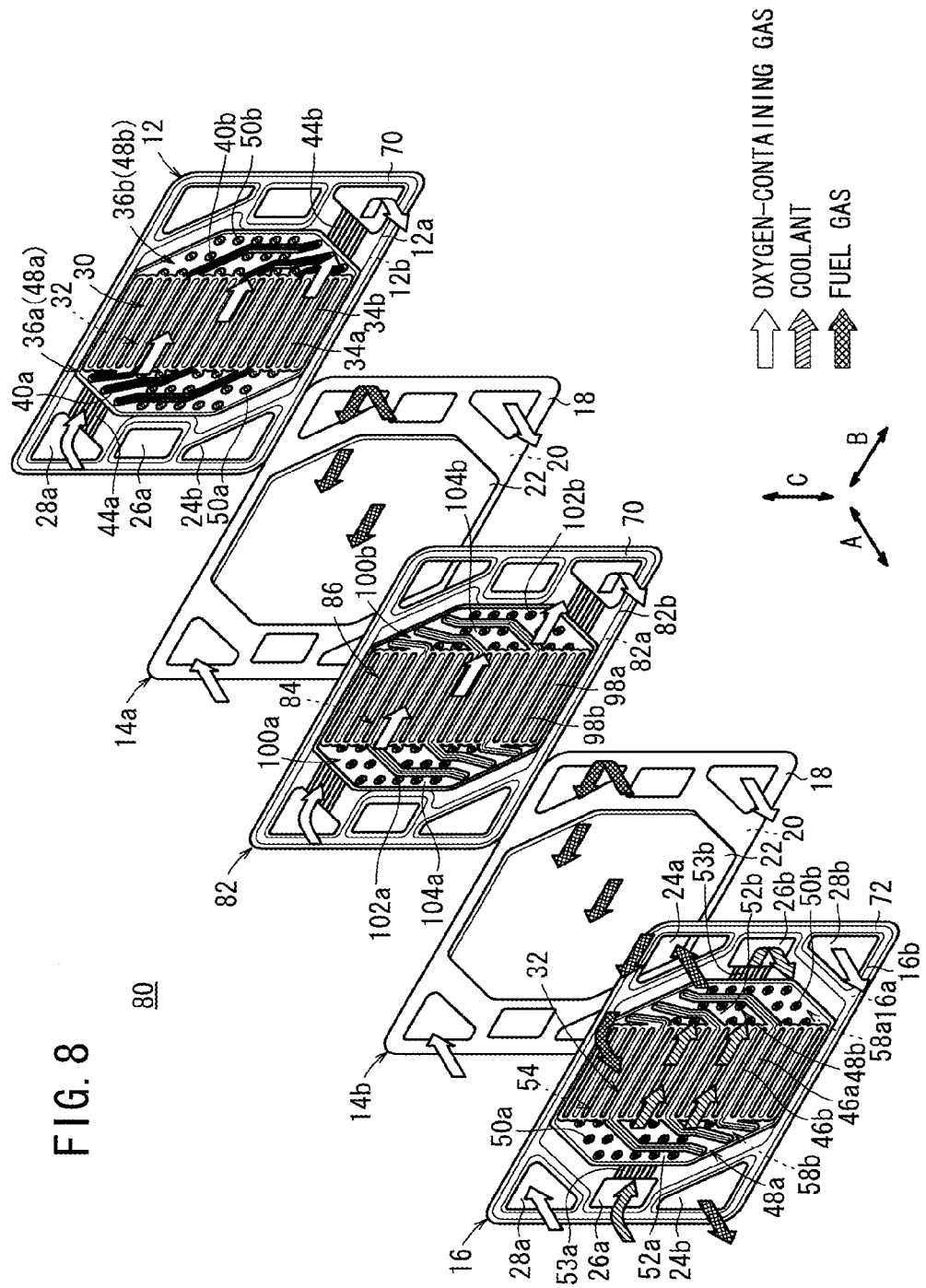
FIG. 8 is an exploded perspective view showing main components of a fuel cell according to a second embodiment of the present invention.

FIG. 8 is an exploded perspective view showing main components of a fuel cell 80 according to a second embodiment of the present invention. The constituent elements of the fuel cell 80 that are identical to those of the fuel cell 10 according to the first embodiment are labeled with the same reference numerals, and description thereof is omitted.

The fuel cell 80 includes a cathode-side metal separator 12, a first membrane electrode assembly 14a, an intermediate metal separator 82, a second membrane electrode assembly 14b, and an anode-side metal separator 16.

Figure 9:
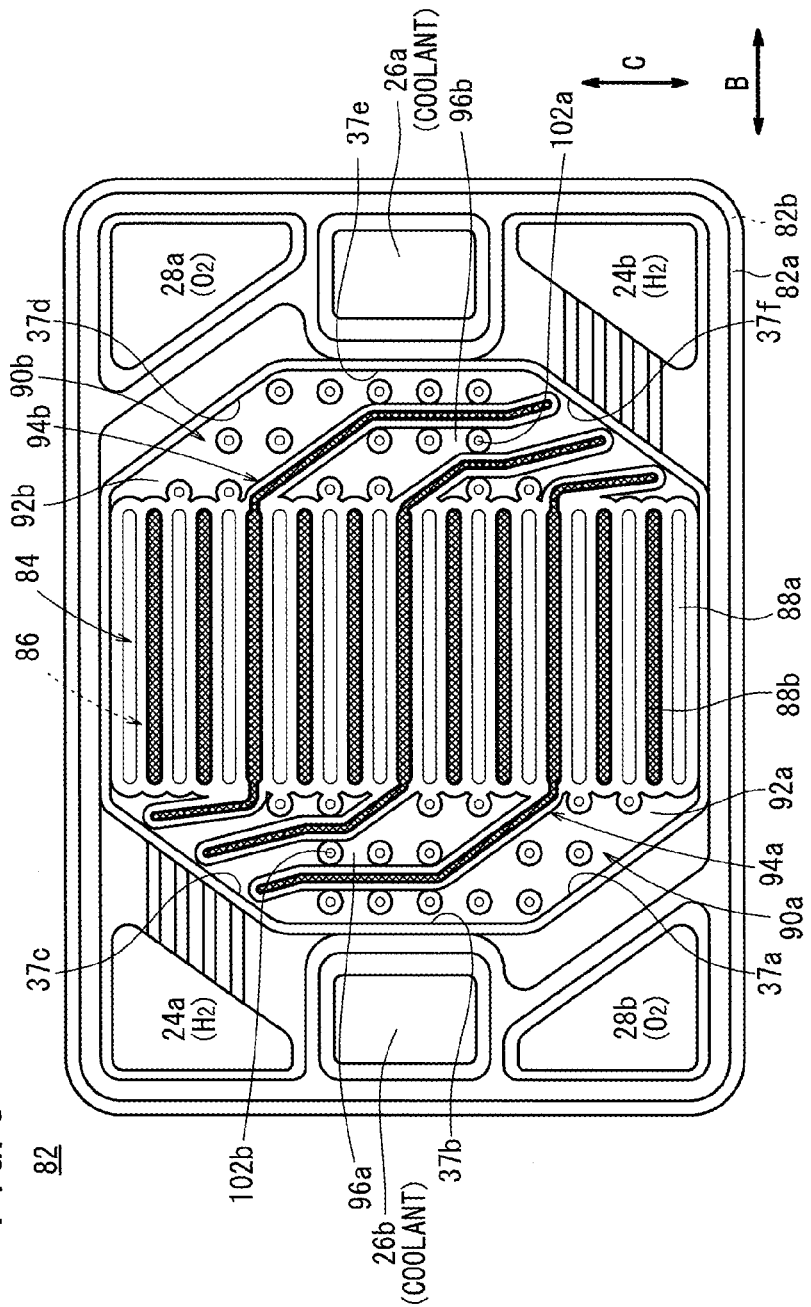
FIG. 9 is a front view showing an intermediate metal separator of the fuel cell.
Figure 10:
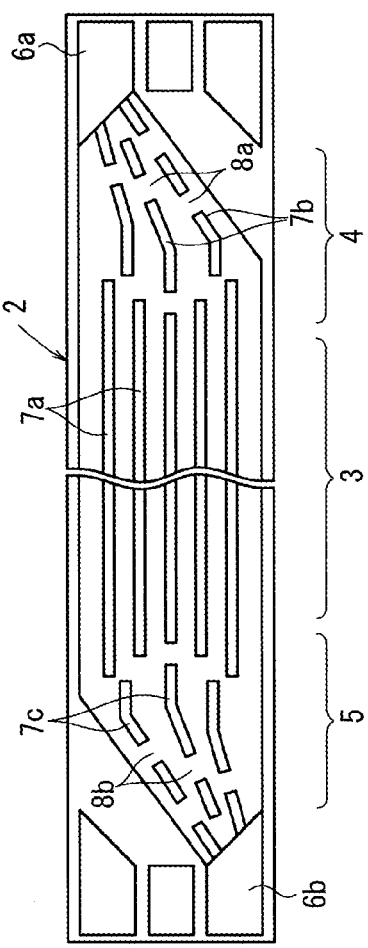
FIG. 10 is a view showing a separator disclosed in Japanese Laid-Open Patent Publication No. 2006-172924.

As shown in FIG. 9, the intermediate metal separator 82 has a fuel gas flow field (reactant gas flow field) 84 on its surface 82a facing the first membrane electrode assembly 14a, and an oxygen-containing gas flow field (reactant gas flow field) 86 on its surface 82b facing the second membrane electrode assembly 14b, the oxygen-containing gas flow field 86 having a shape corresponding to the back side of the fuel gas flow field 84.

The fuel gas flow field 84 includes a plurality of straight flow grooves 88a extending along the power generation surface in the direction indicated by the arrow B. The straight flow grooves 88a are arranged in the direction indicated by the arrow C. Further, the fuel gas flow field 84 includes an inlet buffer 90a and an outlet buffer 90b provided respectively adjacent to the inlet and the outlet of the straight flow grooves 88a. The straight flow grooves 88a are formed between straight flow field ridges (linear flow field ridges) 88b protruding on the surface 82a.

The inlet buffer 90a includes outer lines 37a, 37b, and 37c forming a trapezoidal shape (polygonal shape) in a front view. The inlet buffer 90a has a plurality of continuous linear guide ridges 94a protruding from an intermediate height area 92a toward the fuel gas flow field 84 side, and the linear guide ridges 94a form a continuous guide flow field 96a.

The outlet buffer 90b has linear guide ridges 94b protruding from an intermediate height area 92b toward the fuel gas flow field 84 side, and the linear guide ridges 94b form a continuous guide flow field 96b. The linear guide ridges 94a, 94b have the same structure as the linear guide ridges 62a, 62b.

As shown in FIG. 8, the oxygen-containing gas flow field 86 includes a plurality of straight flow grooves 98a extending along the power generation surface in the direction indicated by the arrow B. The straight flow grooves 98a are arranged in the direction indicated by the arrow C. Further, the oxygen-containing gas flow field 86 includes an inlet buffer 100a and an outlet buffer 100b provided respectively adjacent to the inlet and outlet of the straight flow grooves 98a. The straight flow grooves 98a are formed between straight flow field ridges (linear flow field ridges) 98b protruding on the surface 82b.

The inlet buffer 100a includes bosses 102a protruding from the intermediate height area 92b toward the oxygen-containing gas flow field 86 side, and the bosses 102a form an embossed flow field 104a. The outlet buffer 100b includes bosses 102b protruding from the intermediate height area 92a toward the oxygen-containing gas flow field 86 side, and the bosses 102b form an embossed flow field 104b.

In the second embodiment, the continuous guide flow fields 96a, 96b protruding toward the fuel gas flow field 84 side are formed in the inlet buffer 90a and the outlet buffer 90b on the surface 82a of the intermediate metal separator 82. Therefore, the fuel gas does not flow around the water produced in the power generation reaction.

Further, the embossed flow fields 104a, 104b protruding toward the oxygen-containing gas flow field 86 side are formed in the inlet buffer 100a and the outlet buffer 100b, on the surface 82b of the intermediate metal separator 82. Thus, in the oxygen-containing gas flow field 86, the oxygen-containing gas flows smoothly without any influence by the shapes of the back side of the continuous guide flow fields 96a, 96b.

The invention claimed is:

1. A fuel cell formed by stacking an electrolyte electrode assembly and a metal separator in the form of a corrugated plate in a stacking direction, the electrolyte electrode assembly including electrodes and an electrolyte interposed between the electrodes, a reactant gas flow field as a passage of a fuel gas or an oxygen-containing gas being formed on one surface of the metal separator, a reactant gas supply passage for the fuel gas or the oxygen-containing gas extending through the fuel cell in the stacking direction, wherein the reactant gas flow field includes a plurality of flow field ridges,
wherein the metal separator includes a buffer region formed between an end of the reactant gas flow field and the reactant gas supply passage;
a plurality of continuous linear guide ridges are formed directly in the metal separator and are disposed and formed in the buffer region to form a continuous guide flow field;
the continuous linear guide ridges include bent portions, and the continuous linear guide ridges protrude toward the reactant gas flow field side; and
a plurality of bosses positioned at least between the adjacent continuous linear guide ridges,
wherein in a given buffer region each one of the plurality of continuous guide ridges has a length that is different than lengths of the other ones of the plurality of the continuous guide ridges, and wherein the lengths of each of the plurality of continuous guide ridges decrease in length in a stepwise manner relative to each other in a direction extending towards the reactant gas supply passage,
wherein the continuous linear guide ridges are continuously connected to ends of only selected ones of the plurality of flow field ridges of the reactant gas flow field at predetermined positions and are angled relative thereto, and wherein the flow field ridges form a plurality of flow grooves in the reactant gas flow field for the reactant gas.

2. The fuel cell according to claim 1, wherein the buffer region includes an outer line forming a polygonal shape, and the continuous linear guide ridges are arranged in parallel to the outer line of the buffer ahead of and behind the bent portions.

3. The fuel cell according to claim 1, wherein at least intervals between ends of the continuous linear guide ridges adjacent to the reactant gas supply passage or intervals between ends of the continuous linear guide ridges adjacent to the reactant gas flow field are the same.

4. The fuel cell according to claim 1, wherein the continuous linear guide ridges protrude from an intermediate height area of the buffer region toward the reactant gas flow field side; and
a plurality of bosses protrude from the intermediate height area of the buffer in a direction opposite to the direction toward the reactant gas flow field side.

5. The fuel cell according to claim 1, wherein the buffer region has a trapezoidal shape.

* * * * *